US008423347B2

(12) United States Patent
Tunning et al.

(10) Patent No.: US 8,423,347 B2
(45) Date of Patent: Apr. 16, 2013

(54) NATURAL LANGUAGE PERSONAL INFORMATION MANAGEMENT

(75) Inventors: Brian R. Tunning, Shanghai (CN); Evan J. Gridley, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/448,251

(22) Filed: Jun. 6, 2006

(65) Prior Publication Data
US 2007/0282595 A1 Dec. 6, 2007

(51) Int. Cl.
*G06F 17/27* (2006.01)
(52) U.S. Cl.
USPC ............. 704/9; 715/772; 709/248; 709/238; 709/225; 709/206; 709/205; 709/200; 707/1; 705/7.14; 705/37; 704/201; 704/1; 455/564; 455/466; 455/412.2; 379/88.01
(58) Field of Classification Search ........ 707/1; 709/200, 709/205, 225, 248, 238, 206; 715/772; 704/1, 704/201; 455/466, 564, 412.2; 705/37, 7.14; 379/88.01
See application file for complete search history.

(56) References Cited

U.S. PATENT DOCUMENTS

| | | | | |
|---|---|---|---|---|
| 5,842,009 | A | * | 11/1998 | Borovoy et al. ................ 1/1 |
| 5,974,238 | A | * | 10/1999 | Chase, Jr. ................... 709/248 |
| 6,016,478 | A | | 1/2000 | Zhang et al. |
| 6,049,776 | A | * | 4/2000 | Donnelly et al. ............ 705/7.14 |
| 6,167,376 | A | | 12/2000 | Ditzik |
| 6,289,370 | B1 | * | 9/2001 | Panarello et al. ............. 709/200 |
| 6,311,150 | B1 | * | 10/2001 | Ramaswamy et al. ............ 704/1 |
| 6,396,512 | B1 | | 5/2002 | Nickerson |
| 6,725,276 | B1 | * | 4/2004 | Hardjono et al. ............ 709/238 |
| 6,879,996 | B1 | * | 4/2005 | Laves ........................... 709/206 |
| 6,912,272 | B2 | * | 6/2005 | Kirk et al. ................. 379/88.01 |
| 2002/0077155 | A1 | * | 6/2002 | Chung .......................... 455/564 |
| 2002/0090934 | A1 | * | 7/2002 | Mitchelmore ................ 455/412 |
| 2003/0004856 | A1 | * | 1/2003 | Brown et al. ................... 705/37 |

(Continued)

FOREIGN PATENT DOCUMENTS

| | | |
|---|---|---|
| WO | WO 00/60435 A2 | 10/2000 |
| WO | WO 00/60435 A3 | 10/2000 |
| WO | WO 01/37541 A2 | 5/2001 |
| WO | WO 01/37541 A3 | 5/2001 |

OTHER PUBLICATIONS

Frank Dawson, Lotus Development Corp., "Emerging Calendaring and Scheduling Standards", Computer, Dec. 1997, vol. 30, Issue 12, pp. 126-128, IEEE Computer Society, USA.

(Continued)

*Primary Examiner* — Michael Colucci
(74) *Attorney, Agent, or Firm* — Vierra Magen Marcus LLP (57) ABSTRACT

A PIM application provides a single page natural language interface for entering and managing PIM data. The natural language interface may receive a natural language entry as a text character string. The entry may be associated with a task, calendar, contact or other PIM data type. The received entries are processed (for example, parsed) to determine the PIM data type and other information. The original entry is not discarded from the natural language interface as a result of processing. After processing one or more received natural language entries, the entries remain in the natural language interface to be viewed and managed. The entry is maintained so it can be managed with other natural language entries provided in the interface.

18 Claims, 9 Drawing Sheets

[] Buy groceries on Tuesday night

Dinner with Jane at Wendy's Wednesday at 7pm

Personal:

Take Brian to airport tonight

Business:

Meet with Evan in 30 minutes

George (123) 555-7890 work

Amanda cell (123) 555-6789

U.S. PATENT DOCUMENTS

| | | | |
|---|---|---|---|
| 2003/0014278 A1* | 1/2003 | Park et al. | 705/1 |
| 2003/0182391 A1 | 9/2003 | Leber et al. | |
| 2004/0030781 A1* | 2/2004 | Etesse et al. | 709/225 |
| 2004/0153509 A1* | 8/2004 | Alcorn et al. | 709/205 |
| 2005/0131677 A1* | 6/2005 | Assadollahi | 704/201 |
| 2006/0020804 A1 | 1/2006 | Schleifer et al. | |
| 2007/0101284 A1* | 5/2007 | Shaw et al. | 715/772 |

OTHER PUBLICATIONS

Comerford, et al., IBM Watson Research Center, "The IBM Personal Speech Assistant", Acoustics, Speech, and Signal Processing, May 7, 2001, vol. 1, pp. 1-4, USA.

* cited by examiner

[] Buy groceries on Tuesday night

Dinner with Jane at Wendy's Wednesday at 7pm

Personal:

Take Brian to airport tonight

Business:

Meet with Evan in 30 minutes

George (123) 555-7890 work

Amanda cell (123) 555-6789

NATURAL LANGUAGE PERSONAL INFORMATION MANAGEMENT

BACKGROUND

Personal Information Management (PIM) applications allow a user to enter and manage personal data. The personal data may include calendar, task, note, contact, and email data. Typically, a PIM application will provide at least one interface for entering, viewing and managing each type of data. For example, a contact interface is used to enter and manage contact data, and a task list interface is used to enter and manage task data. A user must navigate to the corresponding interface before viewing, managing or entering each type of data.

For each type of data, information is entered into structured fields of a corresponding interface dedicated to that type of data. Though these structured interfaces allow users to view and enter PIM data in an organized manner, they are limited to that type of data and do not provide for a flexible method of data entry. The structured, limited interfaces within a typical PIM application limits the flexibility of data entry for PIM applications.

SUMMARY

The technology herein, roughly described, provides a single page natural language interface for entering and managing PIM data. A PIM application may provide the natural language interface. The natural language interface may receive a natural language entry from a user or other source. The natural language entry is a text character string which may be associated with a task, contact or other PIM data type.

Once a natural language entry is received through the interface, the entry is parsed and/or otherwise processed. Parsing the entry may determine the PIM data type and other information associated with the entry. PIM data determined from the received entry may be stored and processed in a manner similar to other PIM data.

After the natural language entry is received into the user interface and processed, the entry remains in the interface. The original entry is not discarded from the natural language interface as a result of processing the entry. Rather, the entry is managed along with other natural language entries in the interface. A user does not have to navigate to different interfaces dedicated to a type of PIM data to view and manage the entered natural language entries.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

A PIM application provides a single page natural language interface for entering and managing PIM data. The natural language interface may receive a natural language entry. The natural language entry is a text character string and may be associated with a task, contact or other PIM data type. After processing one or more received natural language entries, the entries remain in the natural language interface to be viewed and managed.

Once a natural language entry is received through the interface, the entry is processed. Processing the entry may include parsing the content of the entry. In some embodiments, parsing may determine the PIM data type and other information associated with the entry. PIM data derived or determined from the received entry may be stored and processed in a manner similar to other PIM data. For example, once a natural language entry is identified as a task data type, information within the entry is stored as a task and may be viewed and managed within a task management interface provided by the PIM application.

After the received natural language entry is processed, the entry remains in the interface. The original entry is not discarded from the natural language interface as a result of processing the entry. Rather, the entry is saved so it can be managed with other natural language entries in the interface. Managing natural language entries may include sorting the entries, viewing selected groups of entries (e.g., work or personal) or entries of a particular data type, and other management and viewing options. Maintaining the natural language entries allows a user to view and manage the entries in a simply, easy-to-read interface. A user does not have to navigate to different interfaces dedicated to one type of PIM data to view and manage the entered natural language entries containing PIM data.

The processing performed on the natural language entry may include parsing. Parsing the natural language entry may result in determining a data type associated with the entry. In particular, parsing the entry may identify one or more dates, times, subjects, pronouns, and other PIM data within the entry. From this parsed data, the data type may be determined. In some embodiments, the PIM data type itself may be determined. This is discussed in more detail below.

In some cases, an entry may have one or more data indicators. A data indicator may identify a data type or other information associated with a natural language entry. For example, a natural language entry may be a character string which reads, "[ ] Buy groceries on Tuesday night." In this case, the data indicator are the brackets, "[ ]" and indicate that the entry is a task. Data indicators are discussed in more detail below.

Figure 1:
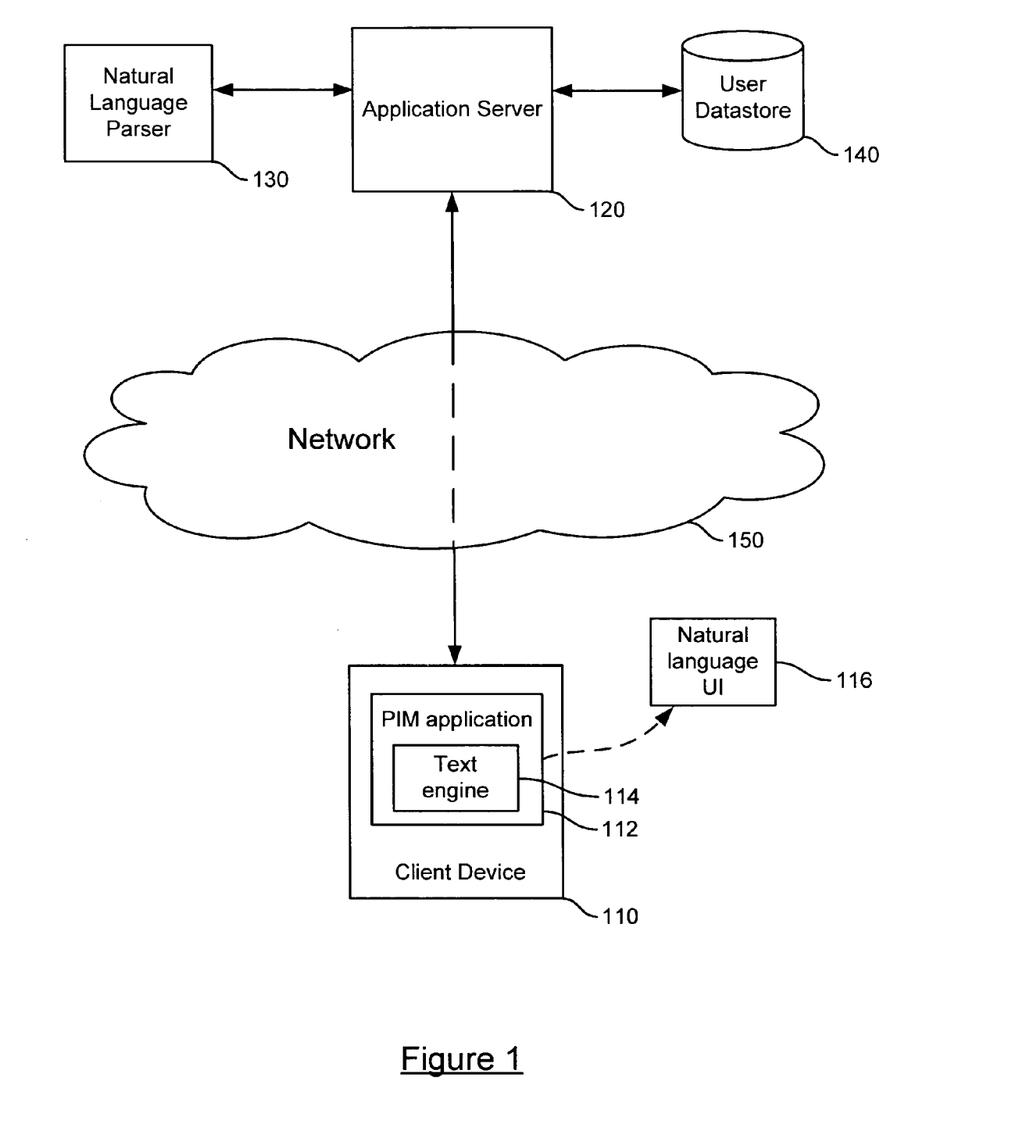
FIG. 1 is a block diagram of an embodiment of a system for providing a natural language personal information management application.

FIG. 1 is a block diagram of an embodiment of a system for providing a natural language PIM application. FIG. 1 includes client device 110, application server 120, natural language parser 130, user data store 140, and network 150.

The PIM application of FIG. 1 is implemented as a client application. As such, it may be installed and executed on client device 110.

Client device 110 communicates with application server 120 over network 150 and includes PIM application 112. In one embodiment, network 150 may be implemented as the Internet. Client device 110 may be implemented as a computing environment discussed in more detail below with respect to FIG. 3.

PIM application 112 is an application for managing personal information for a user. PIM application 112 may manage personal information such as e-mail, contacts, tasks, notes and other user data. In one embodiment, PIM application 112 may be implemented by "Windows Live Calendar," by Microsoft Corporation, of Redmond, Wash. PIM application 112 includes text engine 114 and provides natural language user interface 116. Text engine 114 is an engine or a tool for handling text in an interface. For example, text engine 114 may allow a user interface to display, change and remove text within a window of the interface. Natural language user interface 116 is an interface through which natural language text may be entered and managed. An example of natural language user interface 116 for entering and managing natural language PIM entries is discussed in more detail below with respect to FIG. 4A.

Application server 120 may communicate with PIM application 112 on client device 110 over network 150. Application server is also in communication with natural language parser 130 and user data store 140. Application server 120 may include a server program which provides business logic for PIM application 112. In some embodiments, application server 120 may receive data from PIM application 112 in the form of a request. The received request may be sent by application server 120 to natural language parser 130, user data store 140 or some other destination (not pictured). The received request may be further processed by application server 120 prior to or following being sent to these destinations or following receiving a response from said communication. Application server 120 may be implemented as one or more application servers (not pictured).

Natural language parser 130 may process a string of text to identify portions of the text. The identified text can be managed or otherwise processed by other programs. For example, natural language parser 130 may receive a text string as part of a request from application server 120. Parser 130 may then parse the text string to determine different fields within the text string. For a text string having a form of a sentence, the fields may include subject, verb, noun, pronoun, date, phone and other fields. After parsing the text string, parser 130 may generate and package text metadata into a response. The metadata may contain information regarding different fields identified within the parsed data. The response may then be sent to application server 120. Natural language parser 130 may be implemented separately from application server 120 or as part of application server 120.

User data store 140 may store user data and other data. The stored user data may include PIM data, natural language entry data and other user data. User data store 140 may store, retrieve, edit and delete data in response to a request received from application server 120. User data store 140 may be implemented as one or more databases, servers, memory devices, or other computing devices.

Figure 2:
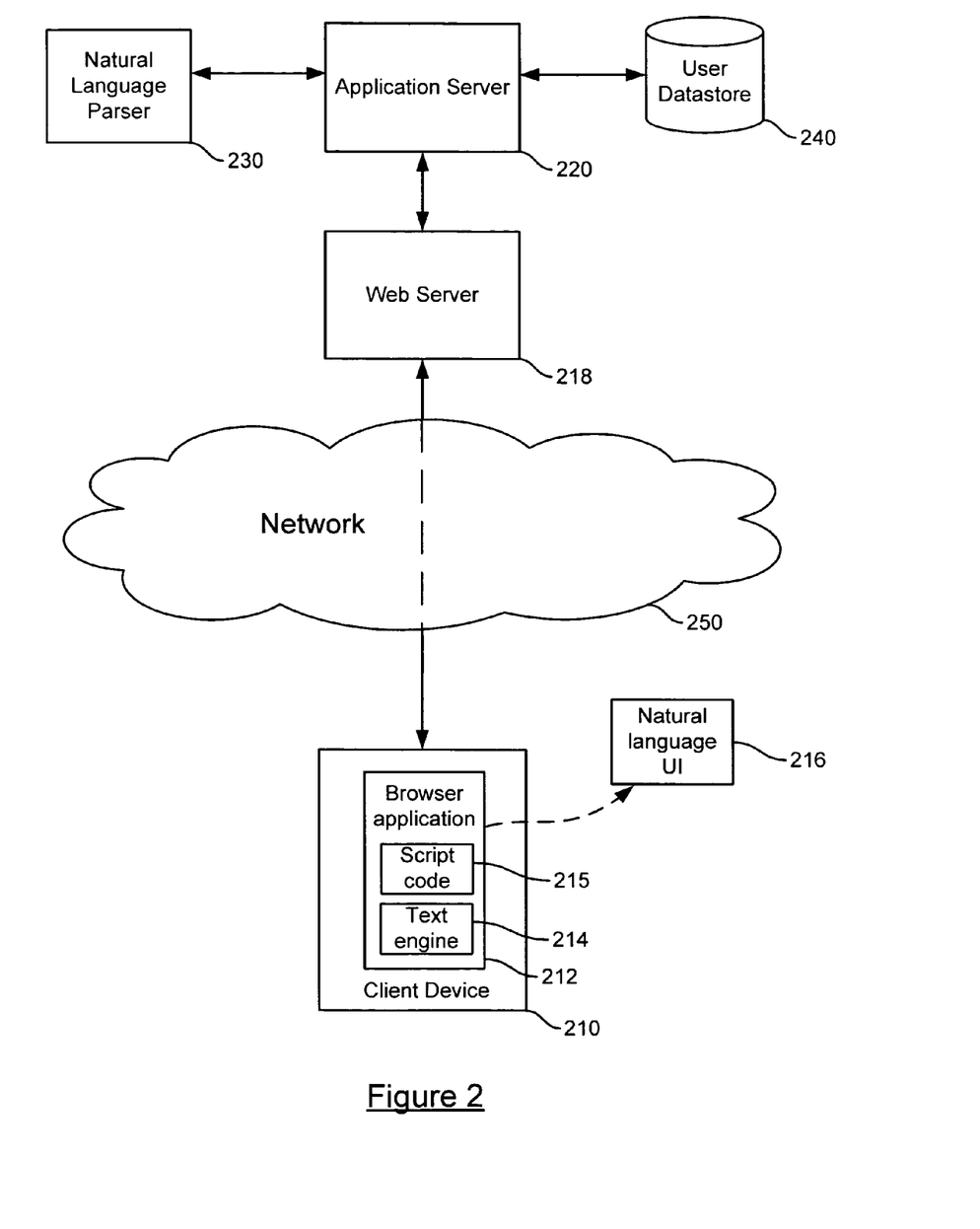
FIG. 2 is a block diagram of an embodiment of a system for providing a natural language web-based personal information management application.

FIG. 2 is a block diagram of an embodiment of a system for providing a natural language web-based PIM application. The system of FIG. 2 includes client device 210, web server 218, application server 220, natural language parser 230, user data store 240 and network 250. The system of FIG. 2 is similar to that of FIG. 1 except the PIM application is implemented as a web-based application. As such, application server 220, natural language parser 230, user data store 240 and network 250 are similar to those of FIG. 1.

Client device 210 includes browser application 212. In one embodiment, browser application 212 may be implemented as the software "Internet Explorer," by Microsoft Corporation, of Redmond, Wash. Browser application 212 may retrieve and display content from web server 218. The content retrieved from web server 218 may implement text engine 214 and script code 215. Alternatively, text engine 214 may be implemented as part of browser application 212 code or the operating system used by client device 210. In some embodiments, text engine 214 may be implemented as a text area, text function, a text range API or some other tool or code for manipulating text. In any case, text engine 214 may function similar to text engine 114 discussed above with respect to FIG. 1. Script code 215 is provided by web server 218 and implemented within browser application 212. The code implements natural language user interface 216 and web-based PIM functions discussed herein. Natural language user interface 216 is similar to interface 116 discussed above with respect to FIG. 1, and is discussed in more detail below with respect to FIG. 4A.

Web server 218 is part of a client/server model that uses hypertext transfer protocol (HTTP) to communicate with client device 210. Web server 218 may be implemented as one or more servers and provides a front end for users and/or applications attempting to access application server 220. Web server 218 provides content which can be viewed using browser application 212 and may communicate with application server 220 in response to requests and other data received from browser application 212. Communication between client device 210, web server 218 and application server 220 is discussed in more detail below.

In some embodiments, the PIM application providing the single page natural language interface does not need to send a request to natural language parser on a remote server. The PIM application may be in communication with a local library or other data store on the client device on which the application resides. Thus, rather then sending the natural language entry to be processed by a remote natural language parser, the parsing may be done on the same machine as the PIM application.

Figure 3:
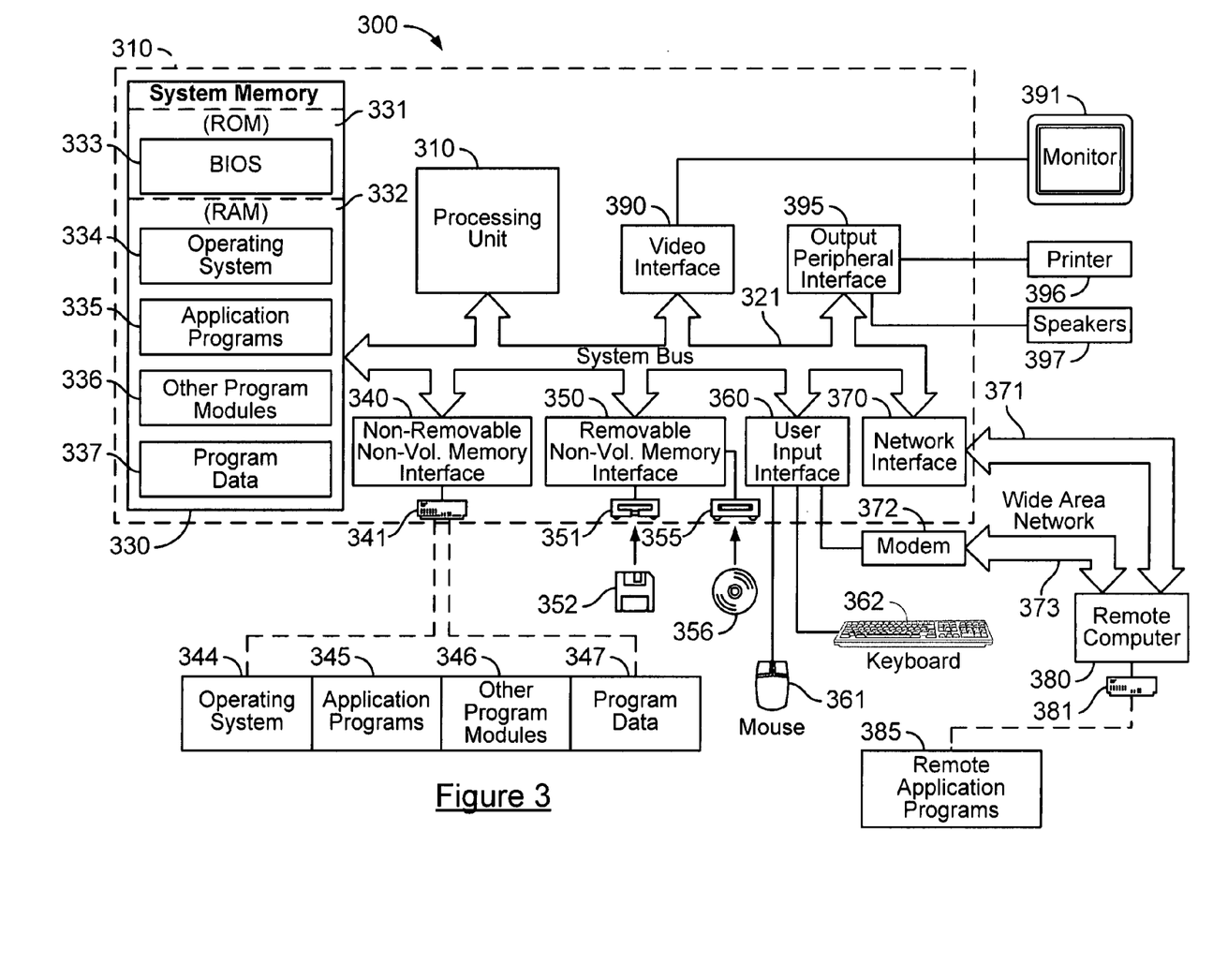
FIG. 3 is an embodiment of a block diagram of a computing environment.

FIG. 3 is an embodiment of a block diagram of a computing environment for use with the present technology. In one embodiment, FIG. 3 provides more detail for client devices 110 and 210, web server 218, application server 120 and 220, natural language parser 130 and 230 and user data stores 140 and 240.

FIG. 3 illustrates an example of a suitable computing system environment 300 on which the invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4A:
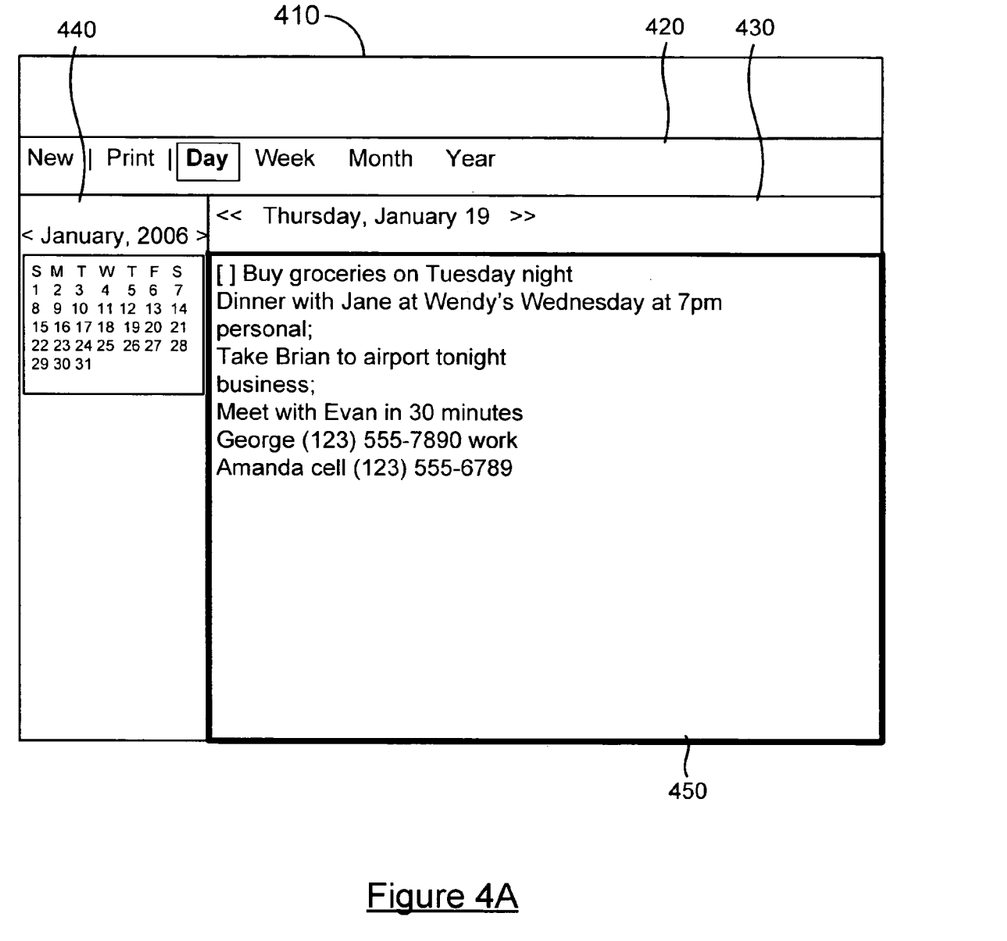
FIG. 4A is an embodiment of a natural language user interface.

FIG. 4A is an embodiment of a natural language user interface. In one embodiment, user interface of FIG. 4A provides more detail for natural language user interface 116 and 216 of FIGS. 1 and 2, respectively. Interface 410 of FIG. 4A includes tool bar 420, date window 430, calendar window 440, and text window 450. Tool bar 420 includes buttons and/or icons which allow a user to select a mode of display as well as perform options such as print data. The mode of display in the embodiment shown may be either a day, week, month or year mode. For the particular mode selected, the natural language entries are displayed (for example, in "day" mode, natural language entries are displayed by day) in text window 450. The currently selected mode is the "day" mode, as indicated by the word "day" in bold and enclosed within a box. Calendar window 440 displays the current month and year as well as a calendar image of the current month. Date window 430 provides information regarding the current date. In some embodiments, date window 430 displays date information corresponding to the entries displayed in text window 450.

Text window 450 receives natural language entries. In some embodiments, the natural language entry may be received as text from a user or other source. For example, the other source could be a program that converts audio to text and provides the text to text window 450. Once entries are received in text window 450, they are processed and may then be managed. Thus, the entries are not removed or discarded by the PIM application immediately after they are received. The entries displayed text window 450 are discussed in more detail below with respect to FIG. 4B. Processing and managing of natural language entries is discussed in more detail with respect to FIGS. 5-8.

Figure 4B:
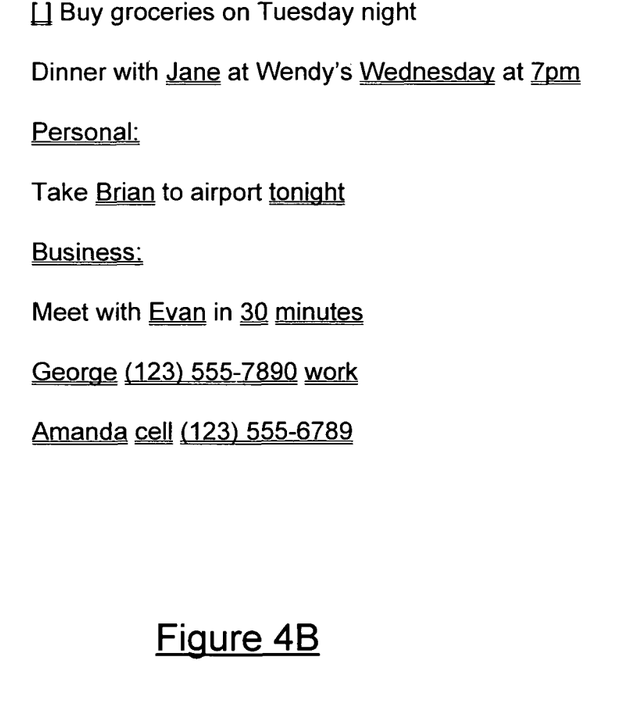
FIG. 4B is an example of a set of natural language entries.

FIG. 4B is an example of a set of natural language entries. In one embodiment, the natural language entries of FIG. 4B are the natural language entries of text window 450 of interface 410 of FIG. 4A. FIG. 4B includes eight natural language entries—six manageable entries and two data type entries. Examples of fields and other data that may be recognized by parsing and other methods are indicated with double underlining in FIG. 4B.

The first entry of FIG. 4B reads, "[ ] Buy groceries on Tuesday night." In this entry, the brackets "[ ]" are a data type indicator. In particular, the brackets identify the entry as a "task" type of data. When this entry is processed, the brackets will be detected and the remaining text will be associated with task type data. The data type indicator can be recognized by a remote parser (such as natural language parser 130 in FIG. 1) or a local parsing engine. In one embodiment, upon recognizing that the entry is associated with a task, the character string located after the brackets may be stored as user task data associated with the user. Storing the entry as user data is discussed in more detail below with respect to FIGS. 5-8. When the user wishes to remove the task from the natural language interface, the user may position a cursor between the brackets and provide input, select the entire entry and provide input to remove the entry or mark the entry as complete, or provide other input.

The second natural language entry reads, "Dinner with Jane at Wendy's Wednesday at 7:00 p.m." In this case, natural language parser 130 or 230 may identify "Jane" as a pronoun and "Wednesday" and "7 pm" as a day and time, respectively. In one embodiment, when an entry is recognized to contain a day and time, the entry may be designated as a calendar event occurring on the particular date and time. In this case, a calendar event is created which includes the entry as a subject. In addition to viewing the entry in the natural language interface provided by a PIM application, the calendar entry could be viewed in a calendar interface provided by the PIM application. In a case where the entry indicates a day rather than a date, the entry may be associated with the next occurrence of the day (e.g., the next occurring "Wednesday"). In some embodiments, though the date and time may be recognized, the entry data may not be placed within a calendar event viewable in a calendar interface.

The third natural language entry reads, "personal," and is followed by a colon. In one embodiment, an entry followed by a colon indicates that the entries that follow are to be associated with a group of that type (e.g., personal, business, etc.) until a different group is specified. Thus, the entries that follow the third natural language entry of "personal:" will be associated with a group called "personal." As part of managing entries in a natural language interface, a user may sort interface entries by group. This is discussed in more detail below.

The fourth natural language entry reads, "Take Brian to airport tonight." This entry is associated with a category of "personal" because it follows the entry, "personal:". When parsed, natural language parser 130 or 230 may identify the pronoun "Brian" and time of day of "tonight." In some embodiments, the entry may be identified as a task or calendar event. As a result, the entry may be identified as one of the two or more tasks or left unspecified, but will remain in the natural language interface to be managed. This is discussed in more detail below.

The fifth natural language entry reads, "business:". As discussed above, entries which follow this entry are associated with a business group. The next natural language entry reads, "Meet with Evan in 30 minutes." When parsed, a natural language parser may identify the pronoun "Evan," the number "30" and the word "minutes". In one embodiment, "30" can be recognized as appearing immediately before the word "minutes", indicating that the task is related to a point in time thirty minutes from the time it was received into the interface. In this case, a calendar event may be generated for thirty minutes from the time the entry was received, and may be viewed in a calendar interface provided by the PIM application. The generated calendar event would include the entry as the subject.

The next natural language entry reads, "George (123) 555-7890 Work". In one embodiment, this entry will be associated with a group of "business" because it follows the fifth entry "business:". Natural language parser 130 or 230 can recognize the pronoun "George," the phone number "(123) 555-7890," and the word "work." As a result, the entry may be identified as contact information for "George," and the phone number may be saved as a "work" number within the user data.

The last natural language entry reads, "Amanda Cell (123) 555-6789." Similar to the sixth entry, this entry will be associated with a group of "business" because it follows the fifth entry "business:". Natural language parser 130 or 230 can recognize the pronoun "Amanda," the phone number "(123) 555-6789," and the word "cell." As a result, the entry may be identified as contact information for "Amanda," and the phone number may be saved as a "cell" number within the user data.

Figure 5:
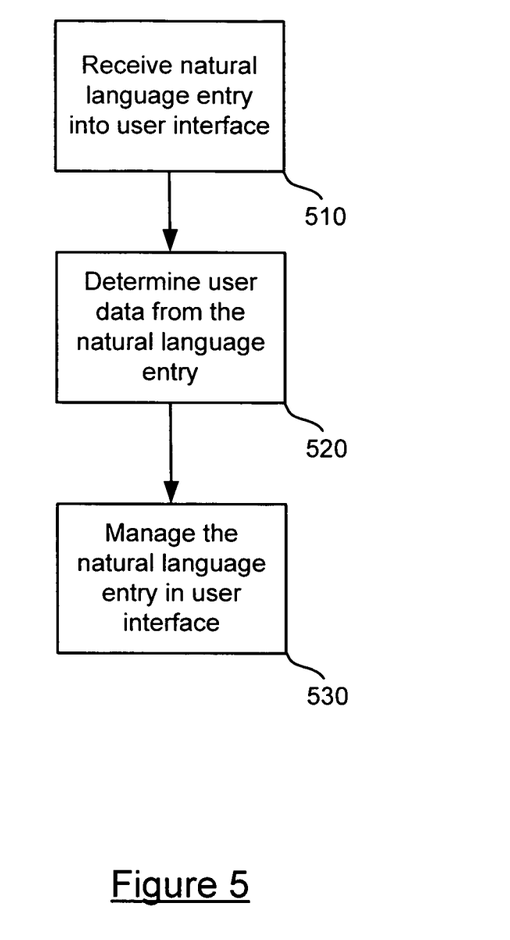
FIG. 5 is a flowchart of an embodiment of a method for implementing a natural language personal information management tool.

FIG. 5 is a flowchart of an embodiment of a method for implementing a natural language PIM tool. The method of FIG. 5 begins when a natural language entry is received into a user interface at step 510. In one embodiment, the natural language entry may be received into text window 450 of user interface 410 of FIG. 4A. The natural language entry may be received as text input from a user. In some embodiments, the text input may be received from a program which converts audio into text. Receiving a natural language entry into a user interface is discussed in more detail below with respect to FIG. 6.

User data is determined from the natural language entry at step 520. Determining user data includes processing the natural language entry. Processing the natural language entry may include parsing the entry. In one embodiment, the natural language entry may be parsed locally by a client application or by script code within a browser application. In this case, the local parsing may identify data type indicators, dates, phone numbers or other information. In some embodiments, user data from a natural language entry is determined by having the natural language entry parsed by a remote server. For example, natural language parser 130 or 230 may parse the natural language entry. Determining user data from a natural language entry is discussed in more detail below with respect to FIG. 7.

After determining user data, the natural language entry is managed within the user interface at step 530. In one embodiment, after the natural language entry is received and processed, the entry is remains in the interface and is managed within the natural language user interface. As such, the entry is not removed or discarded as in traditional natural language applications. Rather, the entry is displayed in the interface to allow a user to monitor the entry, sort, edit or otherwise manage the entry. Managing a natural language entry in a user interface is discussed in more detail below with respect to FIG. 8.

Figure 6:
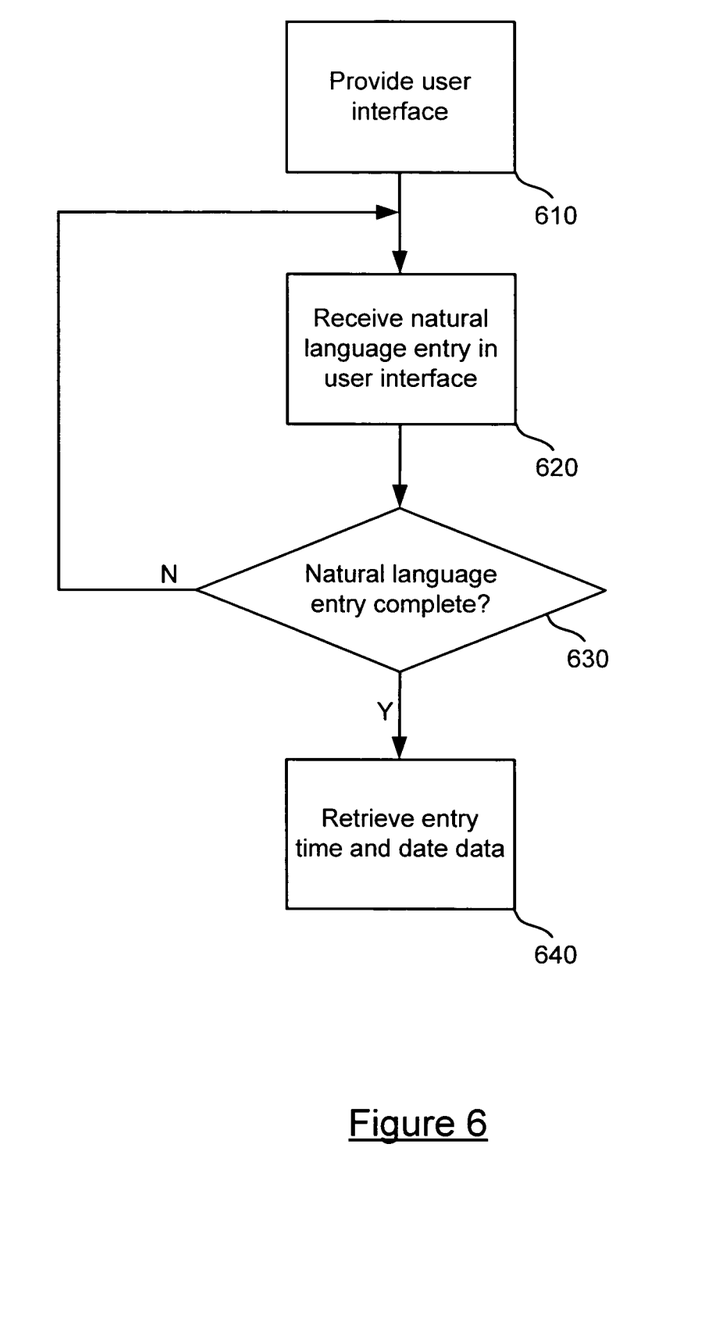
FIG. 6 is a flowchart of an embodiment of a method for receiving a natural language entry of text in a natural language user interface.

FIG. 6 is a flowchart of an embodiment of a method for receiving a natural language entry in a natural language user interface. In one embodiment, the flowchart of FIG. 6 provides more detail of step 510 of FIG. 5. A user interface is provided at step 610. The interface may be provided by client PIM application 112, browser application 212 or some other application. The interface provided may be able to receive a natural language entry of PIM information. For example, the natural language interface may be implemented as interface 410 of FIG. 4A.

Next, a natural language entry is received into the user interface at step 620. The entry may be received as text input from a user or from another source. As discussed above, the text may be received from an application or program that converts audio to text. In this case, a user may speak audio into an audio recording device, the application or program may generate text which corresponds to the user audio, and the generated text may be provided to the user interface. In any case, the entry can be in a natural language format.

After receiving the natural language entry, a determination is made as to whether the natural language entry is complete at step 630. In one embodiment, the determination as to whether the natural language entry is complete includes determining whether an end of entry character is received. In some embodiments, detecting an end of entry character may include detection of a carriage return, period or some other character. In some embodiments, the natural language entry may be determined to be complete after a timeout period has transpired since entry of the last character of the entry string. For example, if a user enters a string of characters into an interface and the PIM application does not receive any further characters for some period of time, the PIM application may determine that the entry is complete. Examples of a timeout period for determining a natural language entry is complete include one minute, five minutes, or some other period of time. If a determination is made that the natural language entry is not complete, the flowchart of FIG. 6 returns to step 620.

If a determination is made that the natural language entry is complete, the PIM application retrieves the time and date associated with the entry at step 640. In some embodiments, entry time and date data includes the time and date at which the natural language entry is completed. This may be used to determine calendar and other information associated with the natural language entry, as well as performing entry management information. This is discussed in more detail with respect to FIG. 8.

Figure 7:
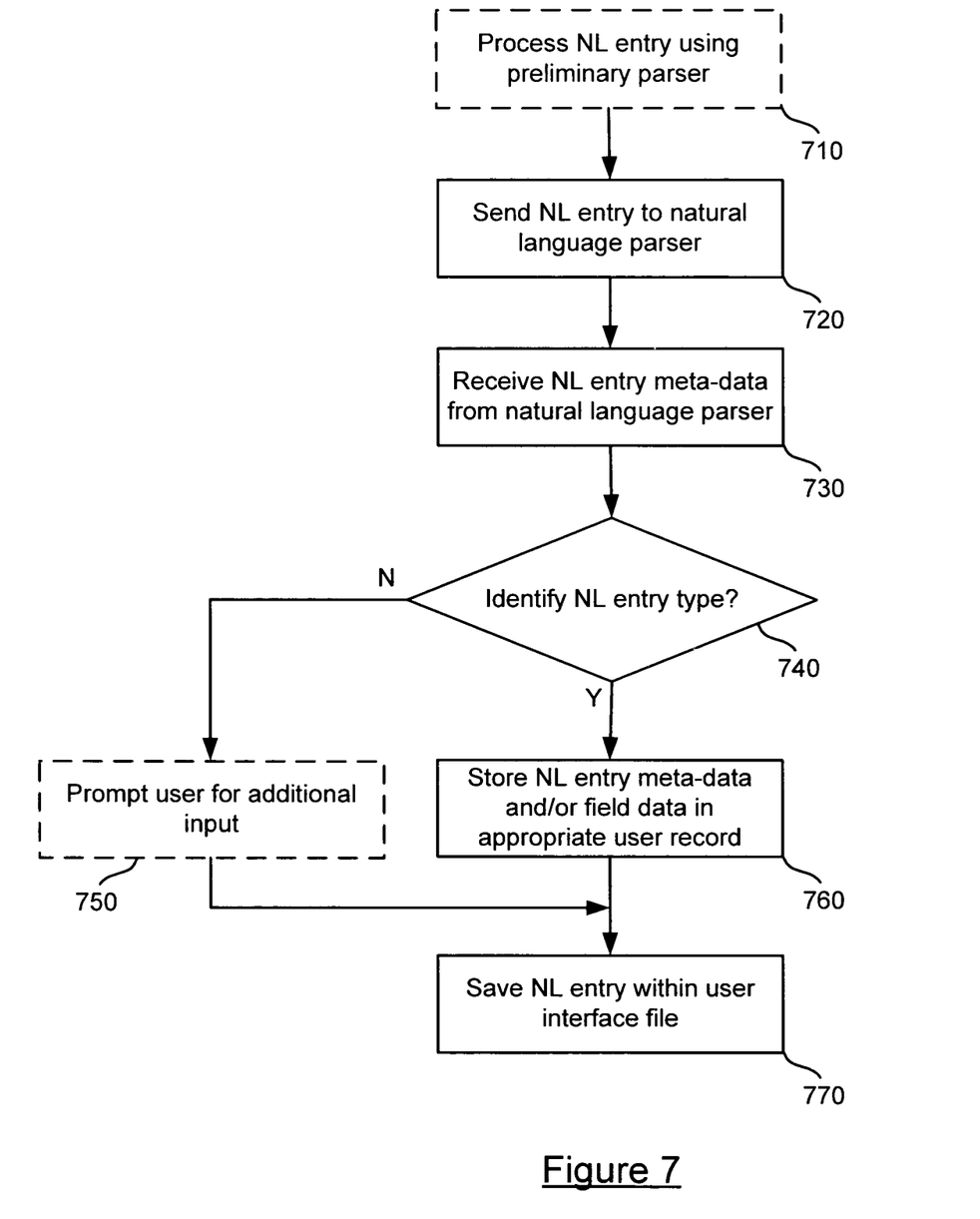
FIG. 7 is a flowchart of an embodiment of a process for determining user data from a natural language entry.

FIG. 7 is a flowchart of an embodiment of a process for determining user data from a natural language entry. In one embodiment, FIG. 7 provides more detail for step 520 of FIG. 5. First, a natural language entry can be processed using a preliminary parser at step 710. The dashed lines comprising step 710 in the flowchart of FIG. 7 indicate that this step is optional. In one embodiment, the preliminary parser may be implemented locally by either a client PIM application (such as application 112 of FIG. 1) or by a browser based PIM application (such as browser application 212 of FIG. 2). The preliminary parser may detect a data type indictor (such as brackets), date information, time information, or other information.

A natural language entry is sent to a natural language parser at step 720. The natural language entry is sent to the natural language parser in order to determine PIM and other data associated with the natural language entry. An example of a process for sending a natural language entry to a natural language parser with respect to the system of FIG. 1 is described as follows. For purposes of discussion only, the process of sending a natural language entry to a natural language parser is discussed with respect to they system of FIG. 1 unless indicated otherwise. First, a PIM application generates a parse request and transmits the request to application server 120 over network 150. The PIM application generating and transmitting the request may be client PIM application 112, browser application 212 implementing a web-based PIM application, or some other application. The parse request includes the natural language entry and optionally other information, such as the date and time of the natural language entry. In the case of a web-based PIM application, web server 218 receives the request and sends a request to application server 220. The request may include the natural language entry received from browser application 212 and other information. In the case of a client based PIM application (such as the system of FIG. 1), application server 120 receives the parse request.

After receiving a parse request, application server 120 sends a parse request to natural language parser 130. Natural language parser 130 receives the parse request, extracts the natural language entry from the request, and parses the entry. In parsing the entry, natural language parser 130 may identify fields within the entry text. The fields may include a sentence subject, verbs, nouns, pronouns, titles, suffixes, email addresses, instant messaging contact information, web sites, times, dates, months, years, phone numbers and other information. Natural language parser 130 then generates metadata associated with detected entry fields and the other information for the entry. The metadata may indicate which words were recognized. Natural language parser 130 then packages the metadata, the natural language entry and other information into a parse response, and forwards the parse response to application server 120.

Upon receiving a parse response from natural language parser 130, application server 120 processes the response. Application server 120 may process the response by generating data from the parsed response. The generated data may include meta-data for the parsed response, such as data indicating whether identified words are nouns, pronouns, verbs, etc. Application server 120 sends a response containing the data and/or meta-data to user data store 140. The response sent by application server 120 to user data store 140 may or may not be identical to the content of the response from natural language parser 130. Data store 140 receives the parse response, stores the natural language entry, and assigns an identifier to the response. In some embodiments, data store 140 may also store user data which was parsed out of the natural language entry. For example, if one of the entries was identified as a task, data store 140 would store the entry as a task. In some embodiments, the PIM application determines user data from the meta-data of the response, and sends a request to data store 140 to store user data. After storing data and assigning an identifier to the entry, data store 140 then transmits the identifier and data to application server 120. Application server 120 then sends a parse response to PIM application 112 over network 150. In one embodiment, the parse response sent by application server 120 includes the metadata associated with the natural language entry, the identifier generated by user data store 140, and optionally other data. In the case of a web-based PIM application, an application server sends the response to web server 218, which then sends a response to browser application 212.

Returning to the flow chart of FIG. 7, the natural language entry metadata generated by natural language parser 130 is received at 730. As discussed above, the metadata may be received as part of a parse response, which may also include an entry identifier and other data. After receiving the entry metadata and optionally other information, a determination is made as to whether the natural language entry is identified at step 740. In one embodiment, the natural language entry may be identified as either a type of PIM data, such as a task, contact, calendar or some other type of data. In some embodiments, a task may be identified as an entry containing an appropriate data type indicator. Contact data may be identified as an entry containing a name and a phone, email or address data. Calendar data may be identified as an entry containing date, day, or time data. In some embodiments, application server 120 or 220 may process the metadata and determine if the entry can be identified as a type of user data. In this case, the application server may include the data type in the parse response sent to the appropriate PIM application. If the entry data type can be identified, the flowchart of FIG. 7 continues to step 760. If the entry data type cannot be identified, the flowchart continues to step 750.

If entry can not be identified, the user may optionally be prompted for additional input at step 750. The prompt for additional input is optional, and need not be performed. In some embodiments, rather than prompt the user for additional input, the appropriate PIM application may simply maintain the unidentified entry within the user interface and allow the user to manage the entry along with other entries. The flowchart at FIG. 7 then continues from step 750 to step 770.

If the entry is identified as a data type, the natural language entry metadata and/or field data are stored in an appropriate user record at step 760. In some embodiments, the natural language entry data may be stored in the native data format of a personal information management application. For example, if a natural language entry is identified to be a task, the information within the entry is stored by the PIM application as a user task. Similarly, if the natural language entry is identified as contact data, the natural language entry fields will be stored as contact data for the user. As a result, in addition to maintaining the natural language entry in the natural language user interface, data associated with the identified entries will also appear in the other PIM application interfaces associated with contacts, tasks and other functionality. After storing the natural language entry metadata in the appropriate user record, the natural language entry is saved in a user interface file. As such, when a user closes and later re-executes the PIM application, the previous natural language entries will appear within a text window of the natural language user interface. In some embodiments, the metadata or user data will be stored in user data store 140 or 240. The flowchart at FIG. 7 then continues from step 760 to step 770.

The entry within the natural language interface is then saved within the interface at step 770. As a result of being saved in the interface, the entry is not removed or discarded immediately after processing. Unlike the traditional natural language interfaces, the entry may be managed by a user after it is received and processed. Management of an entry within a natural language interface is discussed in more detail with respect to FIG. 8.

Figure 8:
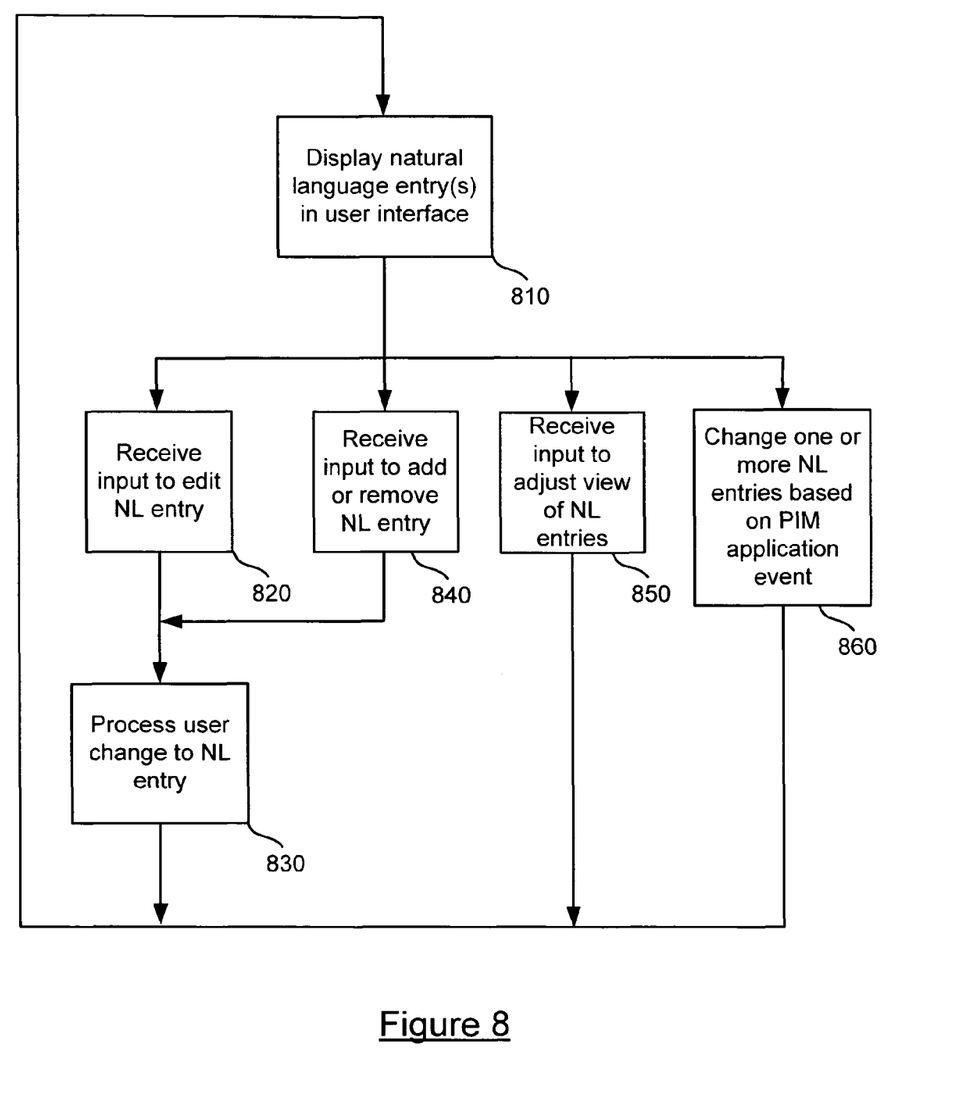
FIG. 8 is a flowchart of an embodiment of a process for managing natural language entries in a user interface.

FIG. 8 is a flowchart of an embodiment of a process for managing natural language entries in a user interface. In one embodiment, FIG. 8 may provide more detail for step 530 of FIG. 5. First, natural language entries are displayed in a user interface at step 810. The natural language interface may be implemented as natural language interface of FIG. 4A. The entries are displayed after they are received and processed as discussed with respect to FIGS. 5-7. Next, any of several steps may occur after step 810. In particular, a natural language entry may be edited, added or removed, the entry view may be adjusted, or an entry may be changed based on a PIM application event.

Input may be received to edit a natural language entry at step 820. If input is received to edit a natural language entry, the user edits to the entry are processed at step 830. In particular, the edited entry is displayed within the user interface and the new entry text is sent to be parsed by natural language parser 130 or 23. Parsing the entry may proceed as discussed above with respect to step 720 of FIG. 7. After parsing the entry and determining other user data from the natural language entry, the flowchart of FIG. 8 returns to step 810.

Input may also be received to add or remove a natural language entry. After receiving input to add or remove a natural language entry, the new entry is processed or the existing entry is removed at step 830. In particular, if input is received to add a natural language entry at step 840, user data is determined from the added entry as discussed with respect to step 520 of the flowchart of FIG. 5. After user data has been determined, the flowchart of FIG. 8 returns to step 810. When a natural language entry is removed, the deletion of the entry is communicated to data store 140 and the entry and corresponding data are deleted from PIM application 112. The flowchart of FIG. 8 then continues to step 810.

Input may be received to adjust a view of natural language entries within an interface at step 850. The view may be adjusted to view entries by group (e.g., personal, work), by most recent, by data type or some other factor. After adjusting a view of natural language entries, the flowchart of FIG. 8 continues to step 810.

In some embodiments, one or more natural language entries may be changed based on a PIM application event. For example, a natural language entry may be removed in response to detecting that a deadline associated with the entry has passed. In some embodiments, rather than automatically removing the entry from the interface, a font color for the entry may be changed in response to a deadline becoming near or having passed. In any case, once the one or more natural language entries have been changed based on the PIM application event, the flowchart of FIG. 8 returns to step 810.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for managing PIM data in a user interface of a personal information management (PIM) application, comprising:
   receiving a first natural language entry from a user into the user interface of the personal information management (PIM) application on an electronic device, the first natural language entry includes text, the PIM application includes a plurality of types of PIM data;
   processing the first natural language entry to identify which type of PIM data the first natural language entry is associated with;
   creating a first new entry in the PIM application based on text in the first natural language entry, the first new entry is for the identified type of PIM data;
   receiving a second natural language entry in the interface of the PIM application, wherein the first natural language entry is maintained in the interface during said receiving the second natural language entry;
   processing the second natural language entry to identify which type of PIM data the second natural language entry is associated with, the determining the type of PIM data includes recognizing text in the second natural language entry;
   creating a second new entry in the PIM application based on the text that was recognized in the second natural language entry, the second new entry is for the identified type of PIM data; and
   maintaining the first and second natural language entries in the interface of the PIM application, the first and second entries are for different types of PIM data.

2. The method of claim 1, wherein the first natural language entry includes an indicator that specifically identifies the type of PIM data.

3. The method of claim 2, wherein the indicator specifies that the first natural language entry is a task.

4. The method of claim 1, wherein said step of processing includes:
   performing preliminary parsing on the first natural language entry by code on a client computer.

5. The method of claim 1, wherein said step of processing includes:
   transmitting the first natural language entry to a remote parsing service.

6. The method of claim 1, wherein said step of processing includes:
   receiving meta data associated with fields of the first natural language entry.

7. The method of claim 1, wherein said creating a new entry in a personal information management (PIM) application based on the one or more fields includes creating a new entry in a calendar program based on time or date information in the one or more fields.

8. The method of claim 1, further comprising:
   receiving edits to the first natural language in the interface entry after creating the second new entry;
   parsing the edited the first natural language entry to determine which type of PIM data is associated with the edited first natural language entry; and
   editing the first new entry based on the edits to the first natural language entry.

9. One or more computer storage media having processor readable code embodied on said computer storage media, said processor readable code for programming one or more processors to perform a method comprising:
   identifying user data in natural language entries within a user interface of a personal information management (PIM) application having a plurality of types of PIM data, including identifying which type of PIM data is associated with each natural language entry, the identifying including determining whether a first of the natural language entries includes an indicator that identifies the type of PIM data;
   storing the user data by the PIM application, including storing at least a portion of each natural language entry in a format associated with the identified type of PIM data;
   saving the natural language entries a file; and
   managing the natural language entries in the user interface after the user data is stored, based on the saved natural language entries.

10. One or more computer storage media according to claim 9, wherein said step of storing includes:
    transmitting the natural language entry to be stored at a remote data store.

11. One or more computer storage media according to claim 9, wherein said step of managing the natural language entry includes:
    displaying the natural language entry in a list of one or more natural language entries within the interface, the list contains entries associated with the plurality of the types of PIM data which include task PIM data, contact PIM data and calendar PIM data.

12. One or more computer storage media according to claim 11, wherein said step of managing includes:
    receiving a request to edit the natural language entry in the list of one or more natural language entries, the user data in the natural language entry is first user data;
    displaying the edited natural language entry in the user interface response to the request to edit, the edited natural language entry including second user data;
    identifying the second user data in the edited natural language entry within the user interface; and
    storing the second user data by the PIM application.

13. One or more computer storage media according to claim 11, wherein said natural language entry is a text entry, the identifying which type of PIM data is associated with each natural language entry includes determining the type of PIM data by parsing the text if there is no indicator that identifies the type of PIM data.

14. The one or more computer storage media according to claim 9, wherein the managing the natural language entry in the user interface after the user data is stored includes:
displaying text of the first natural language entry, along with text of other natural language entries that are associated with other types of PIM data;
receiving edits to the text of the first natural language entry;
parsing the edited text of the first natural language entry to determine which type of PIM data is associated with the edited text of the first natural language entry; and
editing the user data based on the edits to the text of the first natural language entry.

15. An apparatus for processing data, comprising:
a communication interface;
a storage device; and
one or more processors in communication with said storage device and said communication interface, said one or more processors perform a method comprising,
identifying personal information management data in a natural language entry within a user interface of a personal information management (PIM) application, the PIM application includes a plurality of types of PIM data that include task, contact and calendar PIM data, the natural language entry includes a text entry,
parsing the natural language entry to identify which type of PIM data the personal information management data corresponds to, the parsing including determining whether the natural language entry includes an indicator that identifies the natural language entry as task PIM data;
storing the personal information management data in a native data format of a personal information management tool,
storing the natural language entry in a file,
receiving input through the user interface to edit the natural language entry after the storing the natural language entry in the file,
parsing the natural language entry to identify which type of PIM data the edited natural language entry corresponds to; and
changing the stored personal information management data in response to the receiving the input and the identifying which type of PIM data the edited natural language entry corresponds to.

16. The apparatus of claim 15, further comprising:
detecting a time associated with the natural language entry has transpired;
processing the stored personal information management data in response to detecting the time has transpired; and
automatically changing the appearance of the natural language entry in the interface in response to detecting the time has transpired.

17. The apparatus of claim 15, wherein said step of storing the personal information management data includes transmitting the personal information management data to a remote data store, said step of changing the stored personal information management data in response to receiving the input includes transmitting updated personal information management data to the data store.

18. The method of claim 15, wherein the parsing further comprises:
determining whether the natural language entry is calendar PIM data or contact PIM data by parsing the text if there is no indicator that identifies the natural language entry as task PIM data.

* * * * *